United States Patent [19]

Underdown

[11] Patent Number: 4,741,400
[45] Date of Patent: May 3, 1988

[54] METHOD FOR SCALE INHIBITION IN A WELL PENETRATING A SUBTERRANEAN FORMATION

[75] Inventor: David R. Underdown, Plano, Tex.

[73] Assignee: Atlantic Richfield Company, Los Angeles, Calif.

[21] Appl. No.: 894,152

[22] Filed: Aug. 7, 1986

[51] Int. Cl.$^4$ .................................... E21B 41/02
[52] U.S. Cl. ................................ 166/279; 166/371; 166/902; 252/8.552
[58] Field of Search ............... 166/279, 310, 371, 902; 252/8.552

[56] References Cited

U.S. PATENT DOCUMENTS

| | | | |
|---|---|---|---|
| 3,021,901 | 2/1962 | Earlougher | 166/279 |
| 3,481,400 | 12/1969 | Kerver et al. | 166/279 |
| 3,483,925 | 12/1969 | Slyker | 166/279 |
| 3,640,824 | 2/1972 | Bucaram et al. | 252/8.552 X |
| 3,958,635 | 5/1976 | Zilch et al. | 166/279 X |
| 4,126,549 | 11/1978 | Jones et al. | 252/8.552 X |
| 4,357,248 | 11/1982 | Berkshire et al. | 166/279 X |
| 4,390,670 | 6/1983 | Walinsky | 526/271 X |
| 4,485,874 | 12/1984 | Meyers | 166/279 |
| 4,495,996 | 1/1985 | Meyers et al. | 166/307 X |
| 4,602,683 | 7/1986 | Meyers | 166/279 |

Primary Examiner—George A. Suchfield
Attorney, Agent, or Firm—F. Lindsey Scott

[57] ABSTRACT

In an improved method for inhibiting the formation of scale in a well penetrating a subterranean formation for the production of fluids from said formation, said method including injecting at least one scale inhibitor into said formation through said well so that said scale inhibitor is thereafter slowly released from said formation to inhibit the formation of scale, the improvement comprising: injecting at least one polymeric material into said well in an amount effective to prolong said scale formation inhibition, said polymeric material having a composition different from said scale inhibitor and being a copolymer derived from at least one first monomer having a maleic moiety and at least one second monomer selected from the group consisting of acrylic acid, methacrylic acid and mixtures thereof.

11 Claims, 1 Drawing Sheet

U.S. Patent May 3, 1988 4,741,400
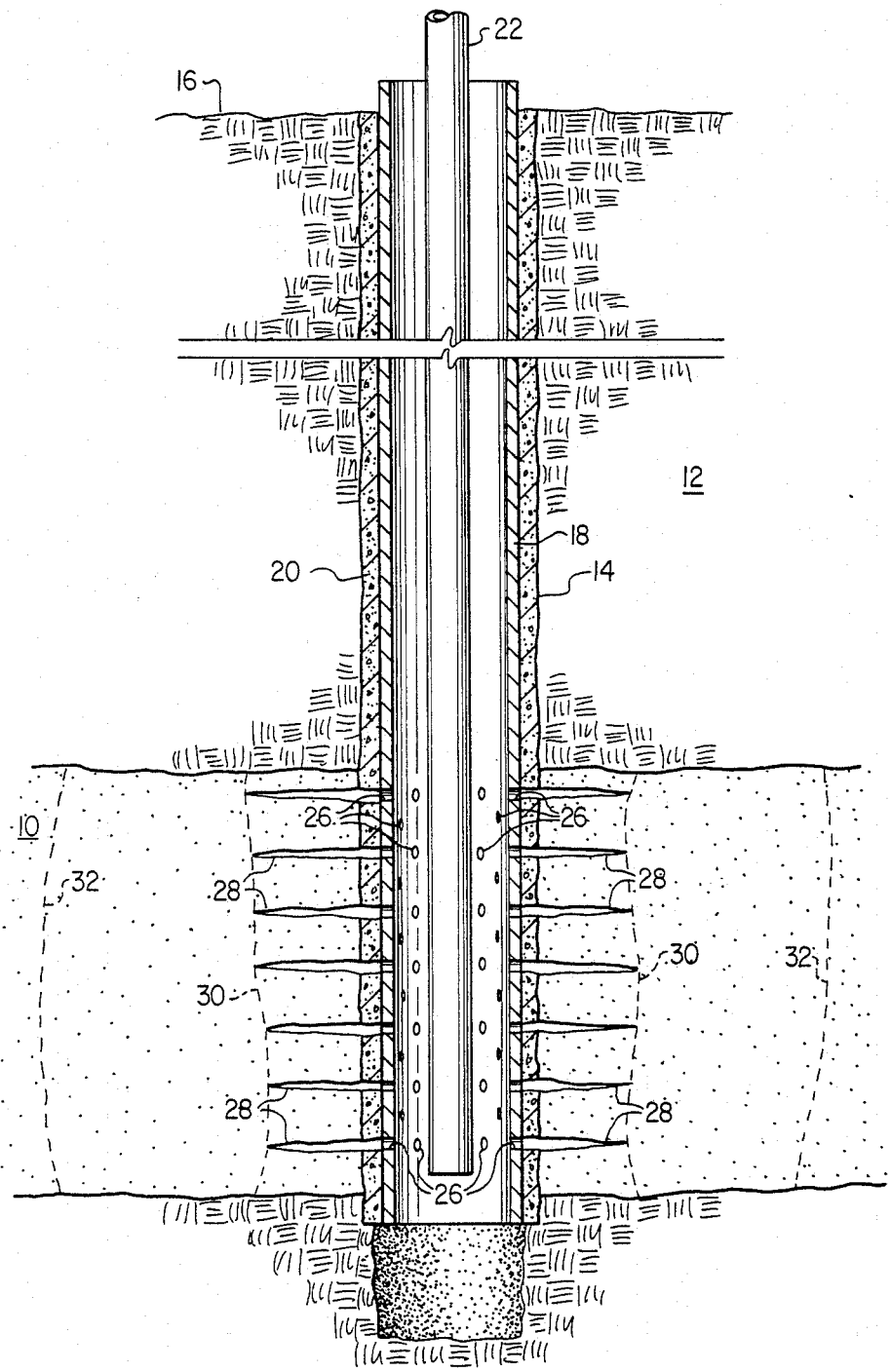

METHOD FOR SCALE INHIBITION IN A WELL PENETRATING A SUBTERRANEAN FORMATION

This invention relates to the inhibition of scale formation in a well penetrating a subterranean formation. More particularly, the invention relates to improved inhibition of scale formation utilizing one or more scale inhibiting components.

In the production of fluids from subterranean formations through a well penetrating the formation, it is necessary that the well and the formation around the well be kept free of materials which would plug either the formation or the well. Some such plugging materials may comprise drilling fluids, cement filtrates and the like used during the drilling and completion of the well. Methods are well known to the art for preventing the entry of these materials into the formation or recovering then from the formation or both so that the formation is not plugged.

After completion of the well and the initiation of the production of fluids from the well plugging or partial plugging of the well, perforations through the well casing or the formation can result from the formation of scale as fluids are produced from the formation. Such scale formation can occur as a result of incompatible fluids in the well, i.e., fluids which when mixed produce precipitates, or from the formation fluids during production. Since the use of incompatible fluids can usually be avoided, the problem of greatest concern is the formation of precipitates from the formation fluids during production. One precipitate which is frequently encountered as scale is calcium carbonate.

Calcium carbonate is readily formed in such environments by reactions such as

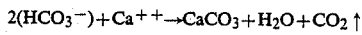

$$2(HCO_3^-) + Ca^{++} \rightarrow CaCO_3 + H_2O + CO_2 \uparrow$$

Such reactions are favored by reductions in the pressure on the formation fluids. Accordingly, in formation fluids which contain soluble carbonates and/or bicarbonates and calcium or other multi-valent cations such as magnesium, barium, iron and the like which form relatively insoluble carbonate compounds, precipitates tend to form at the point at which the pressure in the formation fluids is reduced. Such points tend to be in the formation adjacent the well or in perforations in the well casing. In either instance the production of fluids from the formation is restricted as such scale forms.

In the production of fluids from formations which are susceptible to such scale formation, the production of fluids from such wells tends to decline steadily as the scale forms. To restore the production rates from such wells, various methods have been used.

Such wells can be re-perforated by opening new perforations through the well casings and exposing new formation surfaces. Such methods can be used to restore production rates, but are subject to plugging by the formation of additional scale. These methods are relatively expensive and are of limited value in formations where rapid scale formation occurs.

Acid treatment have been used effectively for the removal of such scale. While the use of acid treatments is effective in many instances it does require removal of the well from production for the acid treatment process which is disadvantageous especially if the formation is subject to rapid scale formation. Further, the production rate begins to decline after the treatment as more scale is formed so that during much of its producing life the well is producing fluids at a reduced rate.

EDTA, ethylenediamine tetraacetic acid salts have been used to remove such scale. The EDTA is generally used in aqueous solution to contact the zone of interest to dissolve such scale. The process is similar to that used with acid treatments and suffers many of the same disadvantages.

To overcome the disadvantages of reduced production rates scale inhibitors have been used. Such scale inhibitors are known to the art as discussed in Water Formed Scale Deposits, Jack C. Cowan and Donald J. Weintritt, Gulf Publishing Company, Houston, Texas, 1976, Chapter 7, "Scale and Deposit Prevention and Control", which is hereby incorporated herein in its entirety by reference. Scale inhibitors such as phosphate esters, polyacrylamides and phosphonic acid derivatives have been used for such purposes. Such scale inhibitors may be used by: (a) acid cleaning the well, well perforations and the formation surrounding the well, (b) removing the cleaning fluids and (c) injecting the scale inhibitor into the formation. The scale inhibitor is then retained in the formation and released slowly with the produced fluids. The presence of small amounts of scale inhibitor in the produced brine (less than 50 ppm) is effective to inhibit the formation of scale in the well, well perforations and in the formation surrounding the well.

In some instances it has been found that a step decline in production rates from such wells occurred immediately after the scale inhibitor treatment. The step decline is typically followed by a long period of stable production rates. It has been disclosed in U.S. Pat. No. 4,485,874, issued Dec. 4, 1984, entitled "METHOD FOR SCALE REMOVAL AND SCALE INHIBITION IN A WELL PENETRATING A SUBTERRANEAN FORMATION" that such step declines can be reversed and the initial production rates after well cleaning with acid restored by an improvement comprising treating the well with EDTA. Further, it has been disclosed in U.S. Pat. No. 4,495,996, issued Jan. 29, 1985, entitled "METHOD FOR SCALE REMOVAL AND SCALE INHIBITION IN A WELL PENETRATING A SUBTERRANEAN FORMATION" that such step declines can be avoided by a method comprising injecting an aqueous solution of EDTA into the well and injecting a scale inhibitor through the well and into the subterranean formation surrounding the well. Each of these patents is hereby incorporated herein in its entirety by reference. Among the scale inhibitors disclosed in these patents are phosphate esters, polyacrylamides, phosphoric acid derivatives and the like. Still there remains a need for new scale inhibitors, particularly for use in high water-cut wells in which desorption or release of conventional scale inhibitors is relatively rapid and the time period for effective scale inhibition is reduced.

Therefore, an object of the present invention is to provide a method for inhibiting the formation of scale in a well penetrating a subterranean formation.

A further object of the present invention is to provide a method for inhibiting the formation of scale in a high water-cut well.

According to the present invention an improvement in a method for inhibiting the formation of scale in a well penetrating a subterranean formation for the production of fluids from the formation is provided. The method comprises injecting at least one scale inhibitor into the formation through the well so that the scale inhibitor is thereafter slowly released from the formation to inhibit the formation of scale. The improvement comprises the injecting at least one polymeric material into the well in an amount effective to prolong the scale formation inhibition, the polymeric material having a composition different from the scale inhibitor and being a copolymer derived from at least one first monomer having a maleic moiety and at least one second monomer selected from the group consisting of acrylic acid, methacrylic acid and mixtures thereof.

The use of one or more of the above-noted copolymers provides substantial advantages. For example, more effective, e.g., prolonged, utilization of scale inhibitors is achieved. This reduces the frequency of interrupting valuable fluid production in order to treat the well and subterranean formation to inhibit scale formation. The present improvement is particularly useful in situations involving high water-cut wells. The benefits obtained using these copolymers are particularly surprising since many of the presently useful copolymers have little or no ability to inhibit scale formation when used alone, i.e., without a formation inhibitor having a different composition, in the present application.

The FIGURE is a schematic diagram of a cased well penetrating a subterranean formation.

The present improved method of scale formation inhibition may be used in conjunction with or as part of a method of removing scale and inhibiting the formation of scale in a well penetrating a subterranean formation for the production of fluids therefrom. Such methods are disclosed in the above-noted U.S. Pat. Nos. 4,485,874 and 4,495,996.

The molecular weight of the suitable copolymers may vary over a wide range. Preferably, the number average molecular weight of the copolymer is in the range of about 500 to about 30,000. Copolymers outside this preferred range have relatively diminished effectiveness or usefulness. For example, very low molecular weight copolymers tend to have reduced ability to prolong scale formation inhibition. Very high molecular weight copolymers tend to be more difficult to produce and handle and to inject into the well. More preferably, the copolymers have a number average molecular weight in the range of about 6,000 to about 25,000, still more preferably about 15,000 to about 25,000. These higher molecular weight copolymers have increased effectiveness in prolonging the scale formation inhibition. This is particularly surprising since the lower molecular weight copolymers, i.e., having a number average molecular weight in the range of about 500 to about 5,000, have more inherent scale formation inhibition capabilities than do the presently preferred higher molecular weight copolymers.

The ratio of first monomer to second monomer copolymerized to produce the presently useful copolymers may vary widely. Preferably, the mole ratio of first monomer to second monomer is in the range of about 35 to 65 to about 65 to 35, more preferably about 50 to 60 to about 50 to 40 and still more preferably about 60 to 55 to about 40 to 45.

The copolymer is preferably substantially homogeneous and is preferably at least partially, and more preferably substantially totally, hydrolyzed prior to being employed in the present method.

Suitable copolymers may be produced by any suitable polymerization process, certain of which are conventional and well known in the art. One particularly useful approach to making these copolymers is disclosed in U.S. Pat. No. 4,390,670 issued June 28, 1983, entitled, "ACRYLATE/MALEATE COPOLYMERS, THEIR PREPARATION AND USE AS ANTISCALANTS," which is hereby incorporated herein in its entirety by reference. The copolymer may also include a minor amount of unreacted first and/or second monomer, e.g., in the range of about 5% by weight to about 40% by weight based on the total copolymer and unreacted first and second monomer present.

The copolymers are preferably employed so that a minor amount of the copolymers is injected into the well relative to the amount of scale formation inhibitor injected. The amount of copolymer injected is preferably in the range of about 3% to about 45%, and more preferably about 5% to about 30%, by weight of the total copolymer plus scale formation inhibitor injected.

The copolymer is preferably injected in combination with an aqueous medium. In one embodiment, the copolymer is substantially soluble in the aqueous medium. The copolymer is preferably present in an amount in the range of about 0.1% to about 10%, more preferably about 0.5% to about 7%, by weight of the water present in the aqueous medium. The aqueous medium may also include an effective amount of winterizing agent or antifreeze so that the polymer/aqueous medium may be utilized in relatively cold environments, such as Alaska's North Slope. Various glycols, in particular ethylene glycol, are preferred as winterizing agents in the aqueous medium.

The copolymer may be injected into the well separately from or together with the scale inhibitor. Preferably, the copolymer is injected substantially simultaneously with the scale inhibitor. More preferably, the copolymer and scale inhibitor are injected together as an admixture in an aqueous medium. The amount of scale inhibitor included in the aqueous medium may vary over a wide range depending, for example, on the specific scale inhibitor, copolymer and aqueous medium employed, and on the specific application involved. Preferably, the scale inhibitor comprises about 1% to about 25%, more preferably about 3% to about 20%, by weight of the water present in the aqueous medium.

Any suitable scale inhibitor or combination of scale inhibitors may be employed in the present method provided that such inhibitor or inhibitors has a composition different from the copolymer being employed. For example, these inhibitors include those conventionally used to inhibit scale formation in fluid producing wells. Such conventional scale inhibitors include phosphate esters, phosphonic acid derivatives, polyacrylamides, polyacrylates, polyacrylate derivatives and mixtures thereof. The scale inhibitor employed preferably is substantially soluble or dispersible in water, e.g., in the above-noted aqueous medium. In one embodiment, the scale inhibitor is preferably a non-polymeric scale inhibitor, more preferably selected from the group consisting of phosphate esters, phosphonic acid derivatives and mixtures thereof. One particularly preferred class of scale inhibitors are the amine phosphonates. The scale inhibitor diethyltriaminepenta (methylene phosphonic acid) (DETPMP) provides excellent results in the present method.

In the FIGURE, a subterranean formation 10 is shown beneath an overburden 12. A wellbore 14 includes a casing 18 cemented in place by cement 20 from surface 16 through formation 10. Wellbore 14 as shown has been completed to a depth greater than the bottom of formation 10, but has not been cased to its full depth. Casing 18 has been perforated in the zone of formation 10 by a plurality of perforations 26 which extend through casing 18 and cement 20 and via extensions 28 into formation 10. Such perforations permit the flow of formation fluids into casing 18. A tubing 22 is positioned in casing 18.

In practice, after wellbore 14 has been drilled and completed as shown, production occurs from formation 10 by the flow of fluids through perforations 26 into the wellbore with the fluids then being recovered through casing 18 if the formation pressure is sufficient. A variety of other well-known techniques can be used for the recovery of fluids from such formations such as pumping, gas lift, and the like. Further, in some instances, the casing may not extend through formation 10 but rather gravel packs, screens and the like may be used or the formation may be produced open hole, etc., as known to the art. The present invention is effective with such variations. In the production of fluids from formation 10 in many instances scale tends to be deposited in zones where the formation pressure is reduced as the fluids flow into wellbore 14. Such zones typically are perforations 26 or the formation in an area 30 adjacent wellbore 14. Since these are zones of flow constriction the formation of scale in these zones results in a reduction in the production of fluid from formation 10. As discussed, such deposits, in many instances, can be removed by mineral acid treatments. The acid treatment can be accomplished by pumping a material which is desirably immiscible with the acid through tubing 22 and into the annulus of casing 18 and thereafter pumping a quantity of acid through tubing 22 into the vicinity of perforations 26. The mineral acid is used as an aqueous solution in an amount effective to remove scale from the well casing 18, casing perforations 26 and the portions of formation 10 to be contacted; and, is maintained in contact with the well casing 18, casing perforations 26 and the contacted portions of formation 10 for an effective time to remove the scale. Contact times from about 0 (i.e., the acid is pumped into and immediately produced from the well) to about 8 hours are typical. The acid is normally removed from the well by the resumption of production of fluids from the well. In many instances, such mineral acid solutions comprise aqueous solutions of hydrochloric acid or nitric acid, with hydrochloric acid being greatly preferred. The solution may also contain a corrosion inhibitor to prevent reaction of the acid with the casing, tubing, and other metallic components of the well. Typical acid concentrations are from about 5% to about 28% acid in aqueous solution. The use of such acid treatments is well known to those skilled in the art. In many instances, the acid treatment is used to treat the wellbore 14, perforations 26 and zone 30 adjacent wellbore 14 and is controlled to avoid pushing any substantial amount of the acid into formation 10. In other instances, it may be desirable to treat formation 10 with the acid and if such is the case, then pressure is used to force the acid into formation 10. If the well is not cased through the zone of interest the formation is similarly treated.

When EDTA treatments are used, a similar procedure is followed.

When an admixture of copolymer and scale inhibitor in an aqueous medium is used, the admixture is pumped into formation 10 a substantial distance shown as zone 32 in the FIGURE. The scale inhibitor and copolymer are at least partially retained in formation 10 and slowly released into the produced fluids as production of fluids from formation 10 occurs. Scale inhibitors are not effective to remove scale, but are effective to prevent future scale formation. The copolymers have been found to prolong the effectiveness of the scale inhibitors injected into the formation.

The mixture of scale inhibitor and copolymer may be used and injected in the same ways and for the same purposes for which the scale inhibitor is used. The mixture may be used to treat new wells, acidized wells, EDTA treated wells and the like. In general the mixture is used to treat wells when it is desired to inhibit scale formation in and around the well. The use of the mixture is effective to slow the release of the corrosion inhibitor from the formation, especially when large amounts of water are recovered from the formation. Although it is desirable that the scale inhibitor be recovered with the water to the extent necessary to inhibit scale formation, it is also desirable that the scale inhibitor be released in no larger quantities. The scale inhibitor release is slowed substantially thus extending the useful life of the scale inhibitor treatment by use of the copolymers.

After the copolymer/scale inhibitor treatment, the well is returned to production and portions of the copolymer/scale inhibitor solution may be produced from the well. Residual scale inhibitor is retained in the formation and the copolymer acts to slow the release of the scale inhibitor with the produced aqueous fluids as the well is produced. The scale inhibitor is released slowly over long periods of time and is effective to prevent scale formation when present even in small quantities, e.g., less than 50 parts per million in the aqueous fluids. Typically, the aqueous copolymer scale inhibitor solution contains about 0.04 to about 0.3 pounds of scale inhibitor per gallon. Volumes of copolymer/scale inhibitor mixture, e.g., aqueous solution containing such components, in the range of about 2 to about 20, more preferably about 4 to about 12, gallons per foot of perforated zone or production zone provide scale inhibition. The copolymer/scale inhibitor combination may be maintained in the formation for a time from about 0 (i.e., the copolymer/scale inhibitor combination is pumped into and immediately recovered from the formation) to about 24 hours.

The following nonlimiting Examples illustrate certain aspects and advantages of the present invention:

EXAMPLES 1 TO 5

A series of five (5) aqueous blends of diethyltriaminepenta (methylene phosphonic acid) (DETPMP) alone and with various polymers were prepared for testing. In each blend in which polymer was present the weight ratio of active DETPMP to active polymer was 2:1, and the concentration of active DETPMP in each blend was 1000 ppm. by weight. The five blends were as follows:

| EXAMPLE | DETPMP | POLYACRYLATE HOMOPOLYMER | MALEIC COPOLYMER |
|---|---|---|---|
| 1 | Yes | No | No |
| 2 | Yes | Yes[1] | No |
| 3 | Yes | Yes[2] | No |
| 4 | Yes | No | Yes[3] |

| EXAMPLE | DETPMP | POLYACRYLATE HOMOPOLYMER | MALEIC COPOLYMER |
|---|---|---|---|
| 5 | Yes | No | Yes[4] |

[1] The number average molecular weight of this polymer is about 2000.
[2] The number average molecular weight of this polymer is about 6000.
[3,4] This copolymer was obtained from Pfizer, Inc. and is a substantially homogeneous copolymer of maleic anhydride and acrylic acid. The copolymer was produced in accordance with preparation procedures disclosed in U.S. Pat. No. 4,390,670. The copolymer used in Example 4 had a number average molecular weight of about 2800, (*FLOCON 280) while the copolymer used in Example 5 had a number average molecular weight of about 19,000 (*FLOCON 287DWG).
*Trademarks of Pfizer Inc.

Each of these blends was tested to determine the rate of DETPMP desorption from subterranean formation core material.

The core material was from preserved cores (from the Sadlerochit formation on Alaska's North Slope), and was extracted with toluene for seven days in a Soxlet extractor. The core material was then dried in a vacuum oven at 150° F. (71° C.) for seven days.

Once dried, the bulk core material was crushed until it passed through a 30 U.S. Mesh screen. This sieved material was used to test each of the five blends.

Each of these blends was tested according to the following procedure. A fixed amount of the clean, dried and sieved core material (5.75 ±0.05 gm) was placed in a 7 inch (17.78 cm.) section of stainless steel tubing, 0.25 inch O.D. (161 min.), with cotton plugs in the end of the tubing. An aqueous solution containing 2% by weight of NaCl at a pH of 4.5 was initially flowed through the tube at 1 cc./min. to wet the core material. Then, the core material was treated with 80 to 100 ml. of the blend to be tested by flowing the test blend through the tube. The treated core material was then flushed by flowing 100–150 ml. of Arctic diesel oil through the tube. An aqueous solution containing 2% by weight of NaCl at a pH of 4.5 was then flowed through the tube and aliquots of the effluent caught in a fraction collector for analysis of residual phosphonate. All the tests were conducted at 190° F. (88° C.) and at a fluid flow rate of 1 cc./min.

Phosphonate concentrations were measured by oxidizing the phosphonate to orthophosphonate and then spectrophotometrically measuring the resulting orthophosphonate concentration. Phosphonate oxidation is accomplished by UV irradiation in the presence of potassium persulfate. The addition of ammonium molybdate to the resulting orthophosphate solution yields a yellow phosphomolybdate complex. This complex is reduced at a pH of 1 to 2 by ascorbic acid to give a dark blue color, the intensity of which depends on the orthophosphonate concentration. Results of the above-noted tests were as listed below:

These results show that both the polyacrylates and the maleic copolymers are effective to slow the release of the scale inhibitor from the core material. The maleic copolymers are particularly effective. For example, the low molecular weight maleic copolymer (Example 4) is substantially as effective as the higher molecular weight polyacrylate (Example 3) in slowing the release of the DETPMP. The higher molecular weight maleic copolymer (Example 5) provides clearly superior effectiveness in slowing the release or desorption of the DETPMP from the core material.

EXAMPLES 6 TO 9

A series of four (4) blends of various combinations of DETPMP, polyacrylate and maleic copolymer were prepared for testing. These blends were as follows:

| EXAMPLE | DETPMP | POLYACRYLATE HOMOPOLYMER | MALEIC COPOLYMER[4] |
|---|---|---|---|
| 6 | Yes | No | No |
| 7[1] | Yes | Yes | No |
| 8[2] | Yes | Yes | No |
| 9[1] | Yes | No | Yes |

[1] This blend included a weight ratio of DETPMP to polymer of 2:1.
[2] This blend included a weight ratio of DETPMP to polymer of 1:2.
[3] The number average molecular weight of this polymer is about 1,300.
[4] This copolymer was obtained from Pfizer, Inc. and is a substantially homogeneous copolymer of maleic anhydride and acrylic or methacrylic acid. The copolymer was produced in accordance with preparation procedures disclosed in U.S. Pat. No. 4,390,670, and has a number average molecular weight of about 9,000 (*FLOCON 9000).
*Trademark of Pfizer Inc.

Each of these blends was tested for scale inhibition effectiveness using the following procedure:

Reagent-grade chemicals were mixed to prepare two brines:

| Solution A | Solution B |
|---|---|
| 1.4669 gm/L CaCl$_2$.2H$_2$O | 6.8838 gm/L NaHCO$_3$ |
| 0.3347 gm/L MgCl$_2$.1H$_2$O | 17.3038 gm/L NaCl |
| 0.1480 gm/L NaSO$_4$ | |
| 17.3038 gm/L NaCl | |

When equal volumes of solutions A and B are mixed, they yield a brine similar to that found in the Sadlerochit formation. In the scale inhibition experiments, 20 ml of solution A and an aliquot of the blend to be tested were mixed in a 50 ml Wheaton vial. The inhibitor stock solutions contained either 20 or 5 gm/L inhibitor (DETPMP and polymer) in an aqueous solution containing two percent NaCl at a pH of 7. Twenty (20) ml of solution B was added to the inhibitor/solution A mixture. The vial was sealed, crimped, agitated, and placed in a hot air convection oven at 190° F. (88° C.) for 24 hours. At least three samples were prepared for each inhibitor and concentration. Fresh solution B was prepared every day.

After 24 hours, the samples were removed from the oven and allowed to cool for one hour. The vials were agitated to ensure a uniform sample, and 20 ml of liquid is removed from the vial by a syringe equipped with a 1.2 micron disposable filter. The filter removes any

| | DETPMP CONCENTRATION IN SPOT SAMPLES OF EFFLUENT, ppm by WT.[1] | | | | |
|---|---|---|---|---|---|
| CUMULATIVE AMOUNT OF EFFLUENT, Ml. | EXAMPLE 1 | EXAMPLE 2 | EXAMPLE 3 | EXAMPLE 4 | EXAMPLE 5 |
| 30 | 1.9 | 5.0 | 6.3 | 4.5 | 5.3 |
| 50 | 0.9 | 2.5 | 3.0 | 2.7 | 3.6 |
| 100 | 0.47 | 1.1 | 1.4 | 1.4 | 2.2 |
| 200 | 0.34 | 0.6 | 0.81 | 0.7 | 1.5 |
| 300 | — | 0.47 | 0.64 | — | 1.2 |

[1] The values presented are based on curves developed from many spot analyses run for each test.

suspended solids from the liquid. One hundred (100) micro liters of 12 molar HCl was added to the 20 ml of filtrate to react the remaining carbonate and bicarbonate ions in solution to prevent further precipitation of divalent cations. The Ca and Mg concentration in the filtrate was determined by EDTA titration.

Percent inhibition is calculated using the following equation:

$$\% I = \frac{C - C_e}{C_o - C_e} \; 100$$

where $C_e$ is the equilibrium divalent ion concentration after 24 hours, and $C_o$ is the initial divalent ion concentration.

Results of the above-noted tests were as listed below:

| Blend Concentration ppm. wt | PERCENT INHIBITORS | | | |
|---|---|---|---|---|
| | EXAMPLE 6 | EXAMPLE 7 | EXAMPLE 8 | EXAMPLE 9 |
| 8 | 76 | 61 | 46 | 60* |
| 16 | 85 | 66 | 55 | 68 |
| 24 | 92 | — | 58 | 72 |

*Similar tests with equivalent amounts of higher molecular weight maleic copolymers provide generally poorer scale inhibition, i.e., generally lower percent inhibition.

These results show that the presently useful maleic copolymers alone are relatively poor scale formation inhibitors, and the higher molecular weight maleic copolymers are relatively poorer scale formation inhibitors than the lower molecular weight maleic copolymers. Thus, it is all the more surprising that the presently useful maleic copolymers, in particular the higher molecular weight maleic copolymers, perform so well in prolonging the effectiveness of other scale inhibitors, e.g., DETPMP.

EXAMPLE 10

This Example illustrates the use of one embodiment of the present invention in conjunction with subterranean formation 10 shown in the FIGURE. After an effective treatment with EDTA to remove scale, the following mixture is pumped into formation 10 a substantial distance as shown by zone 32 in the FIGURE:

| | Wt % |
|---|---|
| DETPMP | 9.15 |
| Maleic Copolymer* | 1.83 |
| Residual Monomer** | 0.85 |
| Ethylene Glycol | 15.0 |
| Water | remainder |

*The copolymer is a substantially homogeneous copolymer of maleic anhydride and acrylic acid. The copolymer is produced in accordance with U.S. Pat. No. 4,390,670 and has an average number molecular weight of 19,000. (***FLOCON 287DWG)
**Equal number of moles of maleic anhydride and acrylic acid.
***Trademark of Pfizer Inc About 8 gallons per foot of formatron 10 to be treated of this mixture is pumped into formation 10. After all this mixture is pumped, a period of about 12 hours passes before fluid production is started. After a period of time, the mixture is effective to inhibit scale formation in subterranean formation 10.

EXAMPLE 11

Example 10 is repeated except that methacrylic acid is used instead of acrylic acid. After a period of time, the mixture is effective to inhibit scale formation in subterranean formation 10.

While this invention has been described with respect to various specific examples and embodiments, it is to be understood that the invention is not limited thereto and that it can be variously practiced within the scope of the following claims.

The embodiment of the present invention in which an exclusive property or privilege is claimed are as follows:

1. In a method for inhibiting the formation of scale in a well penetrating a subterranean formation for the production of fluids from said formation, said method including injecting at least one scale inhibitor into said formation through said well so that said scale inhibitor is thereafter slowly released from said formation to inhibit the formation of scale, the improvement comprising: injecting at least one polymeric material into said well in an amount effective to prolong said scale formation inhibition, said polymeric material having a composition different from said scale inhibitor, a number average molecular weight in the range of about 6000 to about 25,000 and being a copolymer derived from at least one first maleic anhydride monomer and at least one second monomer selected from the group consisting of acrylic acid, methacrylic acid and mixtures thereof.

2. The method of claim 1 wherein said scale inhibitor is a non-polymeric scale inhibitor.

3. The method of claim 1 wherein said copolymer is prepared by copolymerizing a combination comprising about 35 to about 65 mole percent of said first monomer and about 65 to 35 mole percent of said second monomer.

4. The method of claim 1 wherein said polymer is at least partially hydrolyzed.

5. The method of claim 1 wherein said non-polymeric scale inhibitor is an amine phosphonate.

6. The method of claim 5 wherein said amine phosphonate is diethyltriaminepenta (methylene phosphonic acid).

7. The method of claim 1 wherein said polymer is injected substantially simultaneously with said scale inhibitor.

8. The method of claim 1 wherein said polymer and said scale inhibitor are injected as an admixture in a aqueous medium.

9. The method of claim 1 wherein the amount of polymer injected is minor relative to the amount of scale inhibitor injected.

10. The method of claim 9 wherein the amount of polymer injected is in the range of about 3% to about 45% by weight of the total polymer and scale inhibitor injected.

11. In a method for inhibiting the formation of scale in a well penetrating a subterranean formation for the production of fluids from said formation, said method including injecting at least one scale inhibitor into said formation through said well so that said scale inhibitor is thereafter slowly released from said formation to inhibit the formation of scale, the improvement comprising: injecting at least one polymeric material into said well in an amount effective to prolong said scale formation inhibition, said polymeric material having a composition different from said scale inhibitor a number average molecular weight in the range of about 6,000 to about 25,000 and being a copolymer derived from at least one first monomer having a maleic moiety and at least one second monomer selected from the group consisting of acrylic acid, methacrylic acid and mixtures thereof.

* * * * *